(12) United States Patent
Tomura et al.

(10) Patent No.: US 9,242,903 B2
(45) Date of Patent: Jan. 26, 2016

(54) HIGH ZIRCONIA FUSED CAST REFRACTORY

(71) Applicant: Asahi Glass Company, Limited, Tokyo (JP)

(72) Inventors: Nobuo Tomura, Tokyo (JP); Yukihiro Ushimaru, Takasago (JP); Shinya Hayashi, Takasago (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/506,343

(22) Filed: Oct. 3, 2014

(65) Prior Publication Data

US 2015/0024923 A1 Jan. 22, 2015

Related U.S. Application Data

(63) Continuation of application No. PCT/JP2013/060250, filed on Apr. 3, 2013.

(30) Foreign Application Priority Data

Apr. 6, 2012 (JP) ................. 2012-087308

(51) Int. Cl.
*C04B 35/48* (2006.01)
*C03B 5/43* (2006.01)
*C04B 35/484* (2006.01)
*C04B 35/657* (2006.01)

(52) U.S. Cl.
CPC ............. *C04B 35/484* (2013.01); *C03B 5/43* (2013.01); *C04B 35/657* (2013.01); *C04B 2235/3201* (2013.01); *C04B 2235/3217* (2013.01); *C04B 2235/3248* (2013.01); *C04B 2235/34* (2013.01); *C04B 2235/3409* (2013.01); *C04B 2235/3418* (2013.01); *C04B 2235/442* (2013.01); *C04B 2235/72* (2013.01); *C04B 2235/9607* (2013.01)

(58) Field of Classification Search
CPC .................. C03B 5/43; C04B 35/484
See application file for complete search history.

(56) References Cited

U.S. PATENT DOCUMENTS

| | | | |
|---|---|---|---|
| 4,705,763 A | 11/1987 | Hayashi et al. | |
| 5,344,801 A * | 9/1994 | Kida | C04B 35/484 501/103 |
| 5,679,612 A | 10/1997 | Endo et al. | |
| 8,563,453 B2 | 10/2013 | Tomura et al. | |
| 8,642,492 B2 | 2/2014 | Tomura | |
| 8,796,167 B2 * | 8/2014 | Cabodi | C03B 5/43 501/105 |
| 8,822,362 B2 * | 9/2014 | Cabodi | C03B 5/43 501/105 |
| 8,859,445 B2 * | 10/2014 | Cabodi | C03B 5/43 501/105 |
| 9,056,797 B2 * | 6/2015 | Ushimaru | C03B 5/43 |
| 2011/0166008 A1 * | 7/2011 | Gaubil | C03B 5/43 501/104 |
| 2012/0036895 A1 * | 2/2012 | Sato | C03B 5/43 65/374.13 |
| 2013/0152636 A1 * | 6/2013 | Cabodi | C03B 5/43 65/374.13 |
| 2013/0199244 A1 * | 8/2013 | Cabodi | C03B 5/43 65/374.13 |
| 2013/0210606 A1 * | 8/2013 | Tomura | C03B 5/43 501/104 |

FOREIGN PATENT DOCUMENTS

| | | |
|---|---|---|
| FR | 2 723 583 | 2/1996 |
| JP | 56-129675 | 10/1981 |
| JP | 62-59576 | 3/1987 |
| JP | 63-285173 | 11/1988 |
| JP | 6-72766 | 3/1994 |
| JP | 8-277162 | 10/1996 |
| JP | 9-2870 | 1/1997 |
| JP | 2007-176736 | 7/2007 |
| WO | 2010/116960 | 10/2010 |
| WO | 2012/046785 | 4/2012 |
| WO | 2012/046786 | 4/2012 |

OTHER PUBLICATIONS

International Search Report Issued on Jun. 25, 2013, in PCT/JP2013/060250 filed on Apr. 3, 2013.

* cited by examiner

*Primary Examiner* — Karl Group
(74) *Attorney, Agent, or Firm* — Oblon, McClelland, Maier & Neustadt, L.L.P.

(57) ABSTRACT

To provide a high zirconia fused cast refractory having high durability, which hardly has cracks at the time of production of the refractory, during the heating, by temperature changes during use and during the cooling at the time of suspension of operation. A high zirconia fused cast refractory which has a chemical composition comprising from 88 to 96.5 mass % of $ZrO_2$, from 2.5 to 9.0 mass % of $SiO_2$, from 0.4 to 1.5 mass % of $Al_2O_3$, from 0.07 to 0.26 mass % of $Na_2O$, from 0.3 to 1.3 mass % of $K_2O$, from 0 to 0.3 mass % by outer percentage of $Li_2O$, at most 0.08 mass % by outer percentage of $B_2O_3$, and at most 0.08 mass % by outer percentage of $P_2O_5$, and contains $B_2O_3+P_2O_5$ in a content of at most 0.1 mass % by outer percentage.

5 Claims, No Drawings

HIGH ZIRCONIA FUSED CAST REFRACTORY

This application is a continuation of PCT Application No. PCT/JP2013/060250 filed on Apr. 3, 2013, which is based upon and claims the benefit of priority from Japanese Patent Application No. 2012-087308 filed on Apr. 6, 2012. The contents of those applications are incorporated herein by reference in its entirety.

TECHNICAL FIELD

The present invention relates to a high zirconia fused cast refractory. Particularly, it relates to a high zirconia fused cast refractory having excellent durability and reusability even when applied to a glass melting furnace, and being excellent in the productivity.

BACKGROUND ART

Heretofore, a high zirconia fused cast refractory comprising at least 80 mass % of $ZrO_2$ as a chemical component has been used as a refractory for a glass melting furnace. A high zirconia fused cast refractory, which has high corrosion resistance against molten glass and low contamination properties, has been frequently used for a portion of contact with molten glass of a glass melting furnace which is required to have high quality, such as substrate glass for a flat panel display.

The microstructure of a high zirconia fused cast refractory is composed of a slight quantity of pores, a large amount of zirconia ($ZrO_2$) crystal grains and a small amount of matrix glass with which the space between the grains is filled. This matrix glass contains $SiO_2$ as the main component and contains other oxides, such as $Al_2O_3$, $Na_2O$, $B_2O_3$ and $P_2O_5$.

A high zirconia fused cast refractory is exposed to temperature changes in cooling step at the time of its production, and during the heating in a glass melting furnace and during the cooling at the time of suspension of operation, by the process in operation and by corrosion of the refractory itself. By such temperature changes, a thermal stress, and a transformation stress caused by reversible transformation of zirconia crystals accompanied by a significant volume change in a temperature range in the vicinity of 1,000° C., occur in the interior of the refractory. When matrix glass having appropriate thermomechanical properties in an appropriate amount is contained in the refractory, the refractory is flexible against the above stresses, and the stresses are relaxed, whereby no cracks will form on the refractory. In this specification, the fused cast refractory will sometimes be referred to simply as a refractory.

Whereas, if the thermomechanical properties of the matrix glass are inappropriate or if the amount of the matrix glass is insufficient, cracks may form at the time of production of the high zirconia fused cast refractory or during the heating when the refractory is applied to a glass melting furnace. If the refractory has cracks when applied to a portion of contact with molten glass, this portion will be severely corroded by molten glass, whereby the durability of the refractory will significantly be decreased.

In the interior of a high zirconia fused cast refractory, zircon crystals ($ZrO_2.SiO_2$) may be formed in some cases. The zircon crystals in the interior of the refractory are formed by reaction of $ZrO_2$ and $SiO_2$ in the matrix glass, and accordingly formation of the zircon crystals leads to a decrease in the matrix glass in the refractory. Such a refractory in which zircon crystals are formed and the amount of the matrix glass which relaxes the thermal stress and the transformation stress is reduced becomes fragile and is likely to have cracks even by a slight temperature change.

Further, even in a high zirconia fused cast refractory in which zircon crystals are hardly formed by the refractory itself, zircon crystals may be formed by a reaction with molten glass in some cases. This is because either one or both of elution of chemical components which suppress formation of zircon crystals contained in the refractory into molten glass, and invasion of chemical components which accelerate formation of zircon crystals into the refractory from molten glass, occurs. The tendency of the zircon crystals to be formed by the reaction with molten glass is remarkable when the refractory is in contact with low alkali glass such as liquid crystal substrate glass or with alkali-free glass.

Accordingly, in a case where a high zirconia fused cast refractory in which zircon crystals are likely to be formed by the thermal history by the refractory itself, or a high zirconia fused cast refractory in which zircon crystals are hardly formed by the refractory itself but zircon crystals are likely to be formed by a reaction with molten glass, is used as a refractory for a glass melting furnace, even when no cracks form at the time of production and even when no cracks form during the heating, zircon crystals may be formed in the interior of the refractory in operation, whereby cracks are likely to form by the temperature changes in operation, and the durability of the refractory is significantly decreased in some cases.

In general, the durability of the refractory is a factor which determines the life of a glass melting furnace. Accordingly, formation of cracks in the refractory shortens the life of a glass melting furnace, which is one cause to increase the cost for glass production.

Further, in a high zirconia fused cast refractory in which no zircon crystals are formed in a state where the glass meting furnace is in operation, no cracks will form, or even if cracks will form, they are few and small as compared with a refractory in which zircon crystals are formed, and formation of new cracks or propagation of existing cracks during the cooling when the operation of the glass melting furnace is suspended for e.g. adjustment of production tends to be little, and accordingly such a refractory is relatively easily reused.

On the other hand, in a high zirconia fused cast refractory in which zircon crystals are formed, formation of new cracks and propagation of existing cracks are remarkable during the cooling, and further, formation of cracks and propagation occur during the heating again, and thus reusing such a refractory is difficult. Even if it is reused, no high durability will be obtained, and the furnace life will be short. That is, a high zirconia fused cast refractory in which zircon crystals are likely to be formed by itself or by a reaction with molten glass, even if it has a remaining life in a state where the glass melting furnace is in operation, is unsuitable for reuse after suspension of operation.

A means to suppress formation of cracks in a high zirconia fused cast refractory at the time of production, during the heating and in operation has been studied.

Patent Document 1 proposes a high zirconia fused cast refractory which has a chemical composition comprising from 85 to 97 mass % of $ZrO_2$, from 2 to 10 mass % of $SiO_2$, at most 3 mass % of $Al_2O_3$ and from 0.1 to 3 mass % of $P_2O_5$, and containing substantially no rare-earth oxide, whereby cracks to be formed at the time of production are suppressed. However, this refractory contains $P_2O_5$ which accelerates formation of zircon crystals, and has a drawback such that zircon crystals are likely to be formed even by the refractory itself.

Patent Document 2 proposes a high zirconia fused cast refractory which has a chemical composition comprising from 90 to 98 mass % of $ZrO_2$ and at most 1 mass % of $Al_2O_3$, containing no $Li_2O$, $Na_2O$, CuO, CaO and MgO, and containing from 0.5 to 1.5 mass % of $B_2O_3$, or containing from 0.5 to 1.5% of $B_2O_3$ and containing at most 1.5% of one member selected from $K_2O$, SrO, BaO, $Rb_2O$ and $Cs_2O$ or a total content of two or more of them of at most 1.5%, whereby cracking at the time of production is suppressed, a component having a large cation radius is used and the electrical resistivity is high. However, the refractory has a high content of $B_2O_3$ which accelerates formation of zircon crystals, and has a drawback such that zircon crystals are likely to be formed even by the refractory itself.

Patent Document 3 proposes a refractory which has a chemical composition comprising from 90 to 95 mass % of $ZrO_2$, from 3.5 to 7 mass % of $SiO_2$, from 1.2 to 3 mass % of $Al_2O_3$ and from 0.1 to 0.35 mass % in total of $Na_2O$ and/or $K_2O$, and containing substantially no $P_2O_5$, $B_2O_3$ and CuO, whereby the thermal cycle resistance is improved and formation of zircon crystals is suppressed. However, even the refractory of this invention has an insufficient effect to suppress formation of zircon crystals under conditions of contact with molten glass. Further, at the time of production of the refractory particularly at the time of production of a large-sized refractory with a mass of an ingot of at least 300 kg, cracks are likely to form.

Patent Document 4 proposes a refractory which has a chemical composition comprising from 89 to 96 mass % of $ZrO_2$, from 3.5 to 7 mass % of $SiO_2$, from 0.2 to 1.5 mass % of $Al_2O_3$, from 0.05 to 1.0 mass % of $Na_2O+K_2O$, less than 1.2 mass % of $B_2O_3$, less than 0.5 mass % of $P_2O_5$, higher than 0.01 mass % and less than 1.7 mass % of $B_2O_3+P_2O_5$, less than 0.3 mass % of CuO, at most 0.3 mass % of $Fe_2O_3+TiO_2$, from 0.01 to 0.5 mass % of BaO, and at most 0.3 mass % of $SnO_2$. Patent Document 4 discloses that cracking at the time of production of the refractory and cracking by the thermal cycle will not occur, and further, addition of $Na_2O$, $K_2O$ and BaO cause disadvantageous properties of $P_2O_5$ and $B_2O_3$ which accelerate formation of zircon crystals, to disappear. However, even the refractory of this invention still has an insufficient effect to suppress formation of zircon crystals under conditions of contact with molten glass. The reasons are such that $B_2O_3$ and $P_2O_5$ having an effect to accelerate formation of zircon crystals are contained in a relatively high content in Examples of this invention, and that the $K_2O$ content is not sufficient to the relatively high contents of $B_2O_3$ and $P_2O_5$.

Patent Document 5 proposes a refractory which has a chemical composition comprising from 87 to 94 mass % of $ZrO_2$, from 3.0 to 8.0 mass % of $SiO_2$, from 1.2 to 3.0 mass % of $Al_2O_3$, higher than 0.35 mass % and at most 1.0 mass % of $Na_2O$ and higher than 0.02 mass % and less than 0.05 mass % of $B_2O_3$, containing substantially no $P_2O_5$ and CuO, and having a mass ratio of $Al_2O_3$ to $Na_2O$ of from 2.5 to 5.0, whereby formation of zircon crystals by the refractory itself is suppressed. However, in this refractory based on this invention, formation of zircon crystals is suppressed by optimizing the content ratio of $Na_2O$ and $Al_2O_3$, and accordingly under conditions of contact with molten glass containing $Na_2O$ only in a low content, elution of $Na_2O$ occurs in priority. The refractory has a drawback such that by such elution, the proportion of $Na_2O$ and $Al_2O_3$ will soon deviate from the initial value in an unused state, the composition of the refractory departs in a short time from a composition advantageous for suppression of formation of zircon crystals, and the effect to suppress formation of zircon crystals obtainable by the refractory itself is soon lost.

PRIOR ART DOCUMENTS

Patent Documents

Patent Document 1: JP-A-56-129675
Patent Document 2: JP-A-63-285173
Patent Document 3: JP-A-6-72766
Patent Document 4: JP-A-9-2870
Patent Document 5: JP-A-2007-176736

DISCLOSURE OF INVENTION

Technical Problem

The present invention has been made to solve the above problems, and its object is to provide a high zirconia fused cast refractory having high durability, which hardly has cracks at the time of production of a refractory particularly at the time of production of a large-sized fused cast refractory, during the heating, by temperature changes during use and during the cooling at the time of suspension of operation.

Solution to Problem

The present inventors have conducted extensive studies and as a result, found a high zirconia fused cast refractory in which zircon crystals are hardly formed by the refractory itself or even under conditions of contact with molten glass, which has low residual volume expansion even under temperature cycle conditions, and which can effectively suppress formation of cracks at the time of production of the refractory, by adjusting the matrix glass composition particularly by adjusting the $K_2O$ content to be within an appropriate range.

That is, the high zirconia fused cast refractory of the present invention has a chemical composition comprising from 88 to 96.5 mass % of $ZrO_2$, from 2.5 to 9.0 mass % of $SiO_2$, from 0.4 to 1.5 mass % of $Al_2O_3$, from 0.07 to 0.26 mass % of $Na_2O$, from 0.3 to 1.3 mass % of $K_2O$, from 0 to 0.3 mass % by outer percentage of $Li_2O$, at most 0.08 mass % by outer percentage of $B_2O_3$, and at most 0.08 mass % by outer percentage of $P_2O_5$, and contains $B_2O_3+P_2O_5$ in a content of at most 0.1 mass % by outer percentage.

Further, the high zirconia fused cast refractory of the present invention has a chemical composition comprising from 88 to 96.5 mass % of $ZrO_2$, from 2.5 to 9.0 mass % of $SiO_2$, from 0.4 to 1.5 mass % of $Al_2O_3$, from 0.07 to 0.26 mass % of $Na_2O$, from 0.3 to 1.3 mass % of $K_2O$, at most 0.08 mass % by outer percentage of $B_2O_3$, and at most 0.08 mass % by outer percentage of $P_2O_5$, and contains $B_2O_3+P_2O_5$ in a content of at most 0.1 mass % by outer percentage.

Advantageous Effects of Invention

The high zirconia fused cast refractory of the present invention is free from problems of cracking at the time of production of the refractory particularly at the time of production of a large-sized fused cast refractory and is excellent in the productivity, in the refractory, zircon crystals are hardly formed by the refractory itself or even in contact with molten glass, the refractory hardly has cracks at the time of production of the refractory, during the heating, during use and during the cooling, and it its excellent in the durability and the reusability.

Further, the high zirconia fused cast refractory of the present invention hardly has cracks even under conditions of contact with molten glass and is excellent in the durability, and accordingly a long life of a furnace will be obtained when it is applied to a portion of contact with molten glass of a glass melting furnace, the amount of corrosion of the refractory can be reduced, and contamination of molten glass can be reduced. Further, it hardly has cracks even during the cooling at the time of suspension of operation of the glass melting furnace by e.g. adjustment of production, and during the heating again, and accordingly it is easy to reuse the refractory which is less corroded and does not reach the end of its life. Further, the high zirconia fused cast refractory of the present invention is free from problems of cracking which influence the yield at the time of production, and accordingly it is excellent in the productivity of the refractory, and as a result, it is advantageous also in view of the cost.

DESCRIPTION OF EMBODIMENTS

The high zirconia fused cast refractory of the present invention comprises the above chemical components. The roles played by these respective components in the refractory will be described below. In the following description, five components of $ZrO_2$, $SiO_2$, $Al_2O_3$, $Na_2O$ and $K_2O$ are represented by inner percentage. Further, $B_2O_3$, $P_2O_5$ and the other components not specified above are represented by outer percentage assuming that the total content of the components represented by inner percentage to be 100 mass %.

In this specification, "inner percentage" is meant for the proportion of the component in 100 mass % when the total content of the above five components in the high zirconia fused cast refractory is taken as 100 mass %. For example, "$ZrO_2$ is contained in an amount of 90 mass % by inner percentage" means that when the total content of the above five components is taken as 100 mass %, $ZrO_2$ is contained in an amount of 90 mass % in such 100 mass %.

On the other hand, "outer percentage" is a proportion of a component other than the above five components based on the total content of the five components in the high zirconia fused cast refractory, of 100 mass %. For example, "$B_2O_3$ is contained in an amount of 0.01 mass % by outer percentage" means that when the total content of the five components is taken as 100 mass %, $B_2O_3$ is additionally contained in an amount of 0.01 mass %.

The zirconia raw material and the zircon raw material to be used for production of the high zirconia fused cast refractory inevitably contains from 1 to 3 mass % of $HfO_2$, and $HfO_2$ is not substantially lost e.g. by evaporation at the time of production and remains in the refractory, and accordingly, a usual high zirconia fused cast refractory including the refractory of the present invention contains from 1 to 3 mass % of $HfO_2$. Since $HfO_2$ usually plays the same role as $ZrO_2$ in a high zirconia fused cast refractory, a value for $ZrO_2+HfO_2$ is commonly represented simply as $ZrO_2$, and in the present invention also, a value for $ZrO_2+HfO_2$ is represented as $ZrO_2$.

The high zirconia fused cast refractory of the present invention is a high zirconia fused cast refractory composed of a large amount of zirconia crystals, a small amount of matrix glass and a very small quantity of pores. $ZrO_2$ which is a component represented by inner percentage has a high resistance to corrosion by molten glass and is contained as a main component in the refractory. Most of this $ZrO_2$ is present as zirconia crystals having an excellent corrosion resistance to molten glass, and only very small amount of it is present in the matrix glass.

That is, the content of $ZrO_2$ dominates the content of zirconia crystals in the high zirconia fused cast refractory of the present invention and thus influences the corrosion resistance of the refractory to molten glass. In order to obtain high corrosion resistance to molten glass, the $ZrO_2$ content is required to be at least 88 mass %, and is preferably at least 89 mass %. On the other hand, if the $ZrO_2$ content is higher than 96.5 mass %, the amount of the matrix glass which relaxes a stress is relatively small, and cracks are likely to form at the time of production, or by temperature changes during the heating, during use and during the cooling. Accordingly, the content of $ZrO_2$ in the high zirconia fused cast refractory of the present invention is from 88 to 96.5 mass %.

$SiO_2$ which is a component represented by inner percentage is a main component to form the matrix glass. In order to ensure the amount of the matrix glass which functions to relax a stress, $SiO_2$ in an amount of at least 2.5 mass % is required. On the other hand, if a large amount of $SiO_2$ is contained in the refractory, as a matter of course, $ZrO_2$ cannot be contained in a large amount, and the corrosion resistance is lost. Accordingly, the content of $SiO_2$ in the high zirconia fused cast refractory of the present invention is from 2.5 to 9.0 mass %. It is preferably at least 3.0 mass % and at most 8.5 mass %, more preferably at most 8.0 mass %.

$Al_2O_3$ which is a component represented by inner percentage is a component to reduce the viscosity of the matrix glass and at the same time, a component to suppress formation of zircon crystals to a certain extent. Even under conditions of contact with low alkali glass or alkali-free glass under which formation of zircon crystals is remarkable, since many of such glasses have a relatively high content of $Al_2O_3$, the concentration gradient difference as between the refractory and molten glass is small, and elution of $Al_2O_3$ from the refractory is slow. Accordingly, the effect to suppress formation of zircon crystals by $Al_2O_3$ will last for a long period of time.

If the $Al_2O_3$ content is less than 0.4 mass %, the viscosity of the matrix glass tends to be too high, whereby the performance of the matrix glass to relax a stress will be lowered, and accordingly cracks are likely to form at the time of production, or by temperature changes during the heating, during use and during the cooling. On the other hand, if the $Al_2O_3$ content exceeds 1.5 mass %, the viscosity of the matrix glass is lowered more than necessary, and elution of $K_2O$ and $Cs_2O$ which are effective to suppress formation of zircon crystals into molten glass is accelerated, such being disadvantageous. Further, aluminosilicate crystals such as mullite will be formed at the time of production or during use, whereby the amount of the matrix glass is reduced, and accordingly cracks are likely to form at the time of production, or by temperature changes during the heating, during use and during the cooling. Accordingly, the $Al_2O_3$ content in the high zirconia fused cast refractory of the present invention is from 0.4 to 1.5 mass %, preferably from 0.5 to 1.4 mass %.

$Na_2O$ which is a component represented by inner percentage is a component which effectively suppresses formation of cracks at the time of production of a fused cast refractory particularly at the time of production of a large-sized fused cast refractory with a mass of an ingot of at least 300 kg. Further, it is also a component to reduce the viscosity of the matrix glass and at the same time, a component to suppress formation of zircon crystals. Its effect to reduce the viscosity of matrix glass is particularly remarkable, and it may accelerate elution of $Al_2O_3$, $K_2O$ and $Cs_2O$ which are components effective to suppress formation of zircon crystals, into molten glass, and accelerate invasion of components which accelerate formation of zircon crystals such as $B_2O_3$, from molten glass under conditions of contact with molten glass. Thus, it cannot be contained in a large amount. Further, the effect of $Na_2O$ to suppress formation of zircon crystals by the thermal history by the refractory itself is inferior to those of $K_2O$ and $Cs_2O$.

Thus, the content of $Na_2O$ is preferably low, and the $Na_2O$ content in the high zirconia fused cast refractory of the present invention is from 0.07 to 0.26 mass %, preferably from 0.08 to 0.20 mass %, more preferably from 0.09 to 0.15 mass %.

$K_2O$ which is a component represented by inner percentage is also a component to reduce the viscosity of the matrix glass and at the same time, a component to suppress formation of zircon crystals. Like $Al_2O_3$ and $Na_2O$, $K_2O$ has a role to reduce the viscosity of the matrix glass, and by incorporating K20 in the refractory, an effect to suppress cracking on the refractory at the time of production, or by temperature changes during the heating, during use and during the cooling will be obtained. Further, since the cation radius of K is large as compared with Na, elution of $K_2O$ is relatively slow when contacted with molten glass, whereby an effect to suppress formation of zircon crystals will last over a long period of time.

If the amount of $K_2O$ is insufficient, aluminosilicate crystals such as mullite are likely to be formed by heating at the time of production or during use, thus leading to a decrease in the amount of the matrix glass, whereby cracks are likely to form at the time of production, or by temperature changes during the temperature increase, during use and during the cooling. On the other hand, if $K_2O$ is present in an amount exceeding 1.2 mass % or even exceeding 1.3 mass %, potassium-containing aluminosilicate crystals such as leucite are likely to be formed by heating at the time of production or during use, thus leading to a decrease in the amount of the matrix glass, whereby cracks are likely to form at the time of production, or by temperature changes during the heating, during use and during the cooling. The effect to suppress formation of zircon crystals by the refractory itself can be obtained only with $K_2O$ in a small amount, however, to suppress formation of zircon crystals under conditions of contact with molten glass, particularly under conditions of contact with low alkali glass or alkali-free glass, $K_2O$ in an amount of at least 0.3 mass % is required. Accordingly, the content of $K_2O$ in the high zirconia fused cast refractory of the present invention is from 0.3 to 1.3 mass %, preferably from 0.35 to 1.2 mass %, further preferably from 0.4 to 1.1 mass %.

Here, with respect to the contents of $Na_2O$ and $K_2O$, it is preferred to adjust the ratio ($K_2O/Na_2O$) of $K_2O$ to $Na_2O$ by mass % into a predetermined relation. Specifically, the ratio of $K_2O/Na_2O$ is preferably from 1.5 to 15, more preferably from 2 to 13.

If the relative content of $Na_2O$ is high and the $K_2O/Na_2O$ is less than 1.5, the effect to suppress formation of zircon crystals upon contact with the molten glass when used may not sufficiently be obtained. $K_2O$ can stably suppress formation of zircon crystals even under conditions of contact with molten glass. However, if the relative content of $Na_2O$ is low and the $K_2O/Na_2O$ exceed 15, cracks are likely to form at the time of production of the refractory particularly at the time of production of a large-sized refractory with a mass of an ingot of at least 300 kg. That is, in the present invention, a composition of a refractory was found, with which an effect to suppress formation of cracks both at the time of production and at the time of use, is necessarily and sufficiently obtained with good balance, and it was newly found that a more preferred effect is obtained when the $K_2O/Na_2O$ is in a predetermined relation.

Further, the total content ($Na_2O+K_2O$) of $Na_2O$ and $K_2O$ is preferably from 0.4 to 1.4 mass %, more preferably from 0.45 to 1.3 mass %, further preferably from 0.5 to 1.2 mass %. If the total content of $Na_2O$ and $K_2O$ is too low, suppression of formation of zircon crystals is insufficient, and cracks are likely to form at the time of production of the refractory. On the other hand, if the total content of $Na_2O$ and $K_2O$ is too high, cracks are likely to form at the time of production of the refractory, and such is remarkable particularly when the $ZrO_2$ content is high.

Further, $Li_2O$ may be contained in a content of from 0 to 0.3 mass % by outer percentage. Although $Li_2O$ does not contribute to suppression of formation of zircon crystals, it has an effect to promote melting of other materials, and thus improves the productivity when the refractory is produced. On the other hand, if the $Li_2O$ content exceeds 0.3 mass %, cracks may form in the refractory at the time of production of the refractory. The $Li_2O$ content is preferably at most 0.15 mass %, more preferably at most 0.1 mass %, and it is further preferred that substantially no $Li_2O$ is contained excluding inevitable impurities. In a case where $Li_2O$ is contained, its content is at least 0.03 mass %, more preferably at least 0.05 mass %.

$B_2O_3$ which is a component represented by outer percentage is a component which suppresses formation of cracks at the time of production of the refractory, and exhibits the effect even in a small amount. On the other hand, it is a component to promote formation of zircon crystals, and it forms zircon crystals in the refractory only by the thermal history if contained in a large amount, and it may promote formation of zircon crystals under conditions of contact with molten glass even in a small amount in some cases. Accordingly, $B_2O_3$ is contained in the refractory within a range not to impair suppression of formation of zircon crystals, and the composition is precisely controlled, to maintain high productivity of the refractory. In the present invention in which $Al_2O_3$, $Na_2O$, $K_2O$ and $Cs_2O$ greatly contribute to suppression of formation of zircon crystals, a $B_2O_3$ content up to 0.08 mass % by outer percentage is accepted, and the $B_2O_3$ content is preferably at most 0.06 mass %. The $B_2O_3$ content is more preferably at most 0.04 mass %.

$P_2O_5$ is a component to suppress formation of cracks at the time of production of the refractory like $B_2O_3$, and is a component to promote formation of zircon crystals. Accordingly, like $B_2O_3$, $P_2O_5$ may be contained in the refractory within a range not to impair suppression of formation of zircon crystals, and the composition is precisely contained, whereby high productivity of the refractory can be maintained.

$P_2O_5$ is a component which is inevitably included, depending on the type of the zirconia raw material or the zircon raw material. If inclusion of $P_2O_5$ is not accepted at all, a relatively expensive zircon raw material or zirconia raw material which is an expensive purified raw material or the production area of which is limited must be used. However, in the present invention in which $Al_2O_3$, $Na_2O$, $K_2O$ and $Cs_2O$ greatly contribute to suppression of formation of zircon crystals, a $P_2O_5$ content up to 0.08 mass % by outer percentage is accepted, and the $P_2O_5$ content is preferably at most 0.06 mass %. The $P_2O_5$ content is more preferably at most 0.04 mass %. Accordingly, the range from which the zircon raw material or the zirconia raw material is selected is not narrowed, and a relatively low raw material cost can be achieved. Further, in the same manner as in the case of $B_2O_3$, $P_2O_5$ may be contained in the refractory within a range not to impair suppression of formation of zircon crystals, and the composition is precisely contained, whereby high productivity of the refractory can be maintained.

As mentioned above, both $B_2O_3$ and $P_2O_5$ are components to promote formation of zircon crystals, and in order to sufficiently maintain the effect to suppress formation of zircon crystals in the refractory against such components, the total content ($B_2O_3+P_2O_5$) of $B_2O_3$ and $P_2O_5$ in the present invention is at most 0.1 mass % by outer percentage. Considering suppression of formation of zircon crystals, it is preferably at most 0.05 mass %, and it is more preferred that substantially no such components are contained excluding inevitable impurities.

Further, in the present invention, in addition to the above-described components, $Cs_2O$ may be contained. $Cs_2O$ is a component to suppress formation of zircon crystals, and its effect appears even in a low content. Further, since the cation radius of Cs is very large, elution of $Cs_2O$ from the refractory is extremely slow even upon contact with molten glass, and accordingly an effect to suppress formation of zircon crystals will last for a particularly long period of time. On the other hand, although the reason is not clearly understood, excess $Cs_2O$ tends to cause cracks to form at the time of production, and accordingly the $Cs_2O$ content by outer percentage is within a range of at most 3.8 mass %, preferably from 0.05 to 3.5 mass %, more preferably from 0.05 to 2.5 mass %, particularly preferably from 0.05 to 0.7 mass %.

$Fe_2O_3$ and $TiO_2$ which are contained mainly as impurities in the raw material are components to cause coloring and blistering of molten glass, and a high content of them is unfavorable. When the total content of $Fe_2O_3$ and $TiO_2$ by outer percentage is at most 0.3 mass %, there will be no problem of coloring, and the total content is preferably not higher than 0.2 mass %.

Likewise, $Y_2O_3$ and CaO are contained as impurities in the raw material, and they tend to increase the rate of residual volume expansion in a thermal cycle test. A total content of $Y_2O_3$ and CaO by outer percentage of at most 0.3 mass % is not problematic, and the total content is preferably not higher than 0.2 mass %.

BaO is an alkaline earth metal oxide component which has a property to decrease the viscosity of the matrix glass. BaO is not an essential component, and does not deteriorate the properties of the refractory when contained at a low concentration. Accordingly, it is not problematic to incorporate it in the refractory at a low concentration. However, if BaO is contained in the refractory at a high concentration, the viscosity of the matrix glass is remarkably decreased, and thus formation of cracks in the refractory at the time of production tends to be promoted. Accordingly, in a case where BaO is contained, its content is at most 1 mass % by outer percentage.

EXAMPLES

Now, the high zirconia refractory of the present invention will be described in further detail with reference to Examples. However, it should be understood that the present invention is by no means restricted to such specific Examples.

In order to obtain a refractory by an electrically fusing and casting method, raw materials such as alumina, zircon sand, silica, potassium carbonate, cesium carbonate, $B_2O_3$ and $P_2O_5$ were blended to desilicated zircon as a zirconia raw material, to obtain mixed raw materials, and such mixed raw materials were introduced into a triple phase arc electric furnace with an output power of 1,500 kVA equipped with three graphite electrodes and completely melted by Joule heating.

500 to 600 kg of this melt was poured into a graphite mold preliminarily embedded in silica sand as an annealing material, cast and left to cool to a temperature in the vicinity of room temperature. This graphite mold was prepared to obtain a material for a refractory product of 250 mm in thickness× 310 mm in width×820 mm in height containing no shrinkage cavity. Specifically, the mold was designed and prepared so as to obtain an ingot having a riser portion with the same volume as the material portion for the refractory product, provided above the material portion for the refractory product.

After the casting and cooling, the ingot and the graphite mold were taken out from the annealing material, and the graphite mold and the ingot were separated to produce a high zirconia fused cast refractory.

By adjusting the raw material compositions, high zirconia fused cast refractories having chemical compositions as identified in Tables 1 to 6 were obtained. Here, Tables 1, 2 and 5 show Examples of the present invention (Ex. 1 to 15 and 28 to 30) and Tables 3, 4 and 6 show Comparative Examples (Ex. 16 to 27 and 31 to 33). With respect to the chemical composition in the refractory, values regarding $ZrO_2$, $SiO_2$ and $Al_2O_3$ are quantitatively analyzed values determined by a wavelength dispersive X-ray fluorescence spectrometry, and values regarding the other components are quantitatively analyzed values determined by an inductively-coupled plasma emission spectrophotometry. However, quantitative determination for the respective components is not limited to such analysis methods, and can be carried out by another quantitative analysis method.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Composition of refractory [mass %] | $ZrO_2$ | 94.80 | 88.94 | 90.44 | 90.40 | 88.70 | 91.98 | 94.15 | 96.32 |
| | $SiO_2$ | 3.92 | 8.54 | 8.48 | 8.55 | 8.53 | 6.08 | 4.21 | 2.51 |
| | $Al_2O_3$ | 0.71 | 1.41 | 0.41 | 0.40 | 1.41 | 0.91 | 1.00 | 0.70 |
| | $Na_2O$ | 0.12 | 0.10 | 0.26 | 0.25 | 0.15 | 0.20 | 0.10 | 0.07 |
| | $K_2O$ | 0.45 | 1.01 | 0.41 | 0.40 | 1.21 | 0.83 | 0.54 | 0.40 |
| | $B_2O_3$ | 0.008 | 0.050 | 0.040 | 0.070 | 0.002 | 0.005 | Less than 0.002 | 0.004 |
| | $P_2O_5$ | 0.002 | 0.050 | 0.060 | 0.030 | 0.002 | 0.004 | Less than 0.002 | 0.005 |
| | $B_2O_3 + P_2O_5$ | 0.010 | 0.100 | 0.100 | 0.100 | 0.004 | 0.009 | Less than 0.004 | 0.009 |
| | $Cs_2O$ | 0.18 | Less than 0.05 | 1.84 | Less than 0.05 | Less than 0.05 | 1.12 | Less than 0.05 | 0.11 |
| | BaO | 0.03 | Less than 0.01 | 0.01 | Less than 0.01 | 0.05 | 0.05 | Less than 0.01 | Less than 0.01 |
| | $Fe_2O_3 + TiO_2$ | 0.20 | 0.19 | 0.11 | 0.25 | 0.18 | 0.12 | 0.16 | 0.13 |
| | $CaO + Y_2O_3$ | 0.20 | 0.20 | 0.10 | 0.20 | 0.25 | 0.10 | 0.11 | 0.13 |
| | $Na_2O + K_2O$ | 0.57 | 1.11 | 0.67 | 0.65 | 1.36 | 1.03 | 0.64 | 0.47 |
| | $K_2O/Na_2O$ | 3.8 | 10.1 | 1.6 | 1.6 | 8.1 | 4.2 | 5.4 | 5.7 |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Characteristic | Cracking at the time of production (maximum length [mm]) | Less than 30 | Less than 30 | 50 | 50 | Less than 30 | Less than 30 | Less than 30 | Less than 30 |
|  | Rate of residual volume expansion in thermal cycle test [vol %] | 2.0 | 1.6 | 0.9 | 1.2 | 0.2 | 0.7 | 1.4 | 2.6 |
|  | Rate of formation of zircon crystals in thermal cycle test [mass %] | Less than 0.5 | Less than 0.5 | Less than 0.5 | Less than 0.5 | Less than 0.5 | Less than 0.5 | Less than 0.5 | Less than 0.5 |
|  | Rate of formation of zircon crystals in immersion test 1 [mass %] | Less than 0.5 | Less than 0.5 | Less than 0.5 | Less than 0.5 | Less than 0.5 | Less than 0.5 | Less than 0.5 | Less than 0.5 |
|  | Rate of formation of zircon crystals in immersion test 2 [mass %] | Less than 0.5 | Less than 0.5 | Less than 0.5 | Less than 0.5 | Less than 0.5 | Less than 0.5 | Less than 0.5 | Less than 0.5 |

TABLE 2

|  |  | Ex. 9 | Ex. 10 | Ex. 11 | Ex. 12 | Ex. 13 | Ex. 14 | Ex. 15 |
|---|---|---|---|---|---|---|---|---|
| Composition of refractory [mass %] | $ZrO_2$ | 94.13 | 88.95 | 88.92 | 96.26 | 94.67 | 93.76 | 93.96 |
|  | $SiO_2$ | 3.95 | 8.80 | 8.49 | 2.51 | 3.93 | 4.03 | 4.41 |
|  | $Al_2O_3$ | 0.43 | 1.45 | 1.31 | 0.40 | 0.70 | 0.91 | 0.50 |
|  | $Na_2O$ | 0.25 | 0.07 | 0.07 | 0.07 | 0.25 | 0.09 | 0.08 |
|  | $K_2O$ | 1.24 | 0.73 | 1.21 | 0.76 | 0.45 | 1.21 | 1.05 |
|  | $B_2O_3$ | 0.002 | 0.006 | 0.020 | 0.080 | Less than 0.002 | 0.030 | Less than 0.002 |
|  | $P_2O_5$ | 0.003 | 0.004 | 0.080 | 0.011 | Less than 0.002 | 0.070 | Less than 0.002 |
|  | $B_2O_3 + P_2O_5$ | 0.005 | 0.010 | 0.100 | 0.091 | Less than 0.004 | 0.100 | Less than 0.004 |
|  | $Cs_2O$ | 3.64 | 2.90 | 0.61 | Less than 0.05 | 0.18 | 0.21 | Less than 0.05 |
|  | BaO | Less than 0.01 | Less than 0.01 | 0.03 | Less than 0.01 | Less than 0.01 | 0.06 | Less than 0.01 |
|  | $Fe_2O_3 + TiO_2$ | 0.18 | 0.25 | 0.15 | 0.10 | 0.18 | 0.23 | 0.18 |
|  | $CaO + Y_2O_3$ | 0.08 | 0.24 | 0.17 | 0.11 | 0.10 | 0.20 | 0.10 |
|  | $Na_2O + K_2O$ | 1.49 | 0.80 | 1.28 | 0.83 | 0.70 | 1.30 | 1.13 |
|  | $K_2O/Na_2O$ | 5.0 | 10.4 | 17.3 | 10.9 | 1.8 | 13.4 | 13.1 |
| Characteristic | Cracking at the time of production (maximum length [mm]) | Less than 30 | Less than 30 | 60 | 70 | 50 | 50 | 60 |
|  | Rate of residual volume expansion in thermal cycle test [vol %] | 1.8 | 0.6 | 0.6 | 2.7 | 2.2 | 2.0 | 1.8 |
|  | Rate of formation of zircon crystals in thermal cycle test [mass %] | Less than 0.5 | Less than 0.5 | Less than 0.5 | Less than 0.5 | 1.4 | Less than 0.5 | Less than 0.5 |
|  | Rate of formation of zircon crystals in immersion test 1 [mass %] | Less than 0.5 | Less than 0.5 | Less than 0.5 | Less than 0.5 | 0.9 | Less than 0.5 | Less than 0.5 |
|  | Rate of formation of zircon crystals in immersion test 2 [mass %] | Less than 0.5 | Less than 0.5 | Less than 0.5 | Less than 0.5 | 0.8 | Less than 0.5 | Less than 0.5 |

TABLE 3

|  |  | Ex. 16 | Ex. 17 | Ex. 18 | Ex. 19 | Ex. 20 | Ex. 21 |
|---|---|---|---|---|---|---|---|
| Composition of refractory [mass %] | $ZrO_2$ | 93.34 | 87.42 | 92.04 | 92.70 | 94.53 | 92.16 |
|  | $SiO_2$ | 3.94 | 8.66 | 6.15 | 5.65 | 2.72 | 2.91 |
|  | $Al_2O_3$ | 2.02 | 2.34 | 1.41 | 1.01 | 1.01 | 2.91 |
|  | $Na_2O$ | 0.25 | 0.36 | 0.05 | 0.36 | 0.42 | 0.31 |
|  | $K_2O$ | 0.45 | 1.22 | 0.35 | 0.28 | 1.32 | 1.71 |
|  | $B_2O_3$ | 0.212 | 0.275 | 0.242 | 0.081 | 0.101 | 0.050 |
|  | $P_2O_5$ | 0.121 | 0.285 | 0.071 | 0.111 | 0.081 | 0.070 |
|  | $B_2O_3 + P_2O_5$ | 0.333 | 0.560 | 0.313 | 0.192 | 0.182 | 0.120 |
|  | $Cs_2O$ | 0.18 | 0.82 | Less than 0.05 | 0.22 | 0.13 | Less than 0.05 |
|  | BaO | Less than 0.01 | Less than 0.01 | Less than 0.01 | 0.04 | Less than 0.01 | 0.05 |
|  | $Fe_2O_3 + TiO_2$ | 0.20 | 0.23 | 0.23 | 0.21 | 0.16 | 0.11 |
|  | $CaO + Y_2O_3$ | 0.20 | 0.22 | 0.22 | 0.18 | 0.21 | 0.14 |

TABLE 3-continued

|  |  | Ex. 16 | Ex. 17 | Ex. 18 | Ex. 19 | Ex. 20 | Ex. 21 |
|---|---|---|---|---|---|---|---|
| Characteristic | $Na_2O + K_2O$ | 0.70 | 1.58 | 0.40 | 0.64 | 1.74 | 2.02 |
|  | $K_2O/Na_2O$ | 1.8 | 3.4 | 7.0 | 0.8 | 3.1 | 5.5 |
|  | Cracking at the time of production (maximum length [mm]) | Less than 30 | Less than 30 | 100 | Less than 30 | 140 | 150 |
|  | Rate of residual volume expansion in thermal cycle test [vol %] | 5.1 | 12.2 | 1.9 | 2.2 | 1.2 | 1.8 |
|  | Rate of formation of zircon crystals in thermal cycle test [mass %] | 5.2 | 6.5 | 4.7 | 5.3 | Less than 0.5 | Less than 0.5 |
|  | Rate of formation of zircon crystals in immersion test 1 [mass %] | 7.8 | 4.3 | 8.0 | 7.0 | Less than 0.5 | Less than 0.5 |
|  | Rate of formation of zircon crystals in immersion test 2 [mass %] | 7.1 | 5.0 | 7.7 | 7.0 | Less than 0.5 | Less than 0.5 |

TABLE 4

|  |  | Ex. 22 | Ex. 23 | Ex. 24 | Ex. 25 | Ex. 26 | Ex. 27 |
|---|---|---|---|---|---|---|---|
| Composition of refractory [mass %] | $ZrO_2$ | 95.14 | 95.37 | 86.99 | 92.51 | 93.22 | 94.08 |
|  | $SiO_2$ | 2.53 | 2.63 | 8.54 | 4.91 | 4.33 | 4.12 |
|  | $Al_2O_3$ | 1.62 | 1.31 | 3.11 | 1.88 | 2.02 | 1.30 |
|  | $Na_2O$ | 0.04 | 0.05 | 0.15 | 0.17 | 0.20 | 0.25 |
|  | $K_2O$ | 0.67 | 0.64 | 1.21 | 0.53 | 0.23 | 0.25 |
|  | $B_2O_3$ | 0.132 | 0.233 | 0.002 | Less than 0.002 | Less than 0.002 | 0.030 |
|  | $P_2O_5$ | 0.091 | Less than 0.002 | 0.003 | Less than 0.002 | Less than 0.002 | 0.080 |
|  | $B_2O_3 + P_2O_5$ | 0.223 | Less than 0.235 | 0.005 | Less than 0.004 | Less than 0.004 | 0.110 |
|  | $Cs_2O$ | 0.67 | 0.55 | 0.00 | 4.18 | 0.45 | Less than 0.05 |
|  | BaO | 0.02 | 0.03 | 0.05 | 0.02 | Less than 0.01 | Less than 0.01 |
|  | $Fe_2O_3 + TiO_2$ | 0.15 | 0.19 | 0.18 | 0.18 | 0.16 | 0.17 |
|  | $CaO + Y_2O_3$ | 0.17 | 0.16 | 0.25 | 0.18 | 0.16 | 0.12 |
|  | $Na_2O + K_2O$ | 0.71 | 0.69 | 1.36 | 0.70 | 0.43 | 0.50 |
|  | $K_2O/Na_2O$ | 16.8 | 12.8 | 8.1 | 3.1 | 1.2 | 1.0 |
| Characteristic | Cracking at the time of production (maximum length [mm]) | 200 | 170 | 120 | 100 | 110 | 150 |
|  | Rate of residual volume expansion in thermal cycle test [vol %] | 2.1 | 2.2 | 1.7 | 1.8 | 5.5 | 5.1 |
|  | Rate of formation of zircon crystals in thermal cycle test [mass %] | Less than 0.5 | Less than 0.5 | Less than 0.5 | Less than 0.5 | Less than 0.5 | 4.6 |
|  | Rate of formation of zircon crystals in immersion test 1 [mass %] | Less than 0.5 | Less than 0.5 | Less than 0.5 | Less than 0.5 | Less than 0.5 | 5.2 |
|  | Rate of formation of zircon crystals in immersion test 2 [mass %] | Less than 0.5 | Less than 0.5 | Less than 0.5 | Less than 0.5 | Less than 0.5 | 6.3 |

TABLE 5

|  |  | Ex. 28 | Ex. 29 | Ex. 30 |
|---|---|---|---|---|
| Composition of refractory [mass %] | $ZrO_2$ | 96.34 | 88.94 | 90.44 |
|  | $SiO_2$ | 2.50 | 8.54 | 8.48 |
|  | $Al_2O_3$ | 0.79 | 1.41 | 0.41 |
|  | $Na_2O$ | 0.07 | 0.10 | 0.26 |
|  | $K_2O$ | 0.30 | 1.01 | 0.41 |
|  | $B_2O_3$ | 0.002 | 0.050 | 0.040 |
|  | $P_2O_5$ | 0.003 | 0.050 | 0.060 |
|  | $P_2O_5 + B_2O_3$ | 0.005 | 0.100 | 0.100 |
|  | $Cs_2O$ | 0.19 | Less than 0.05 | 1.84 |
|  | $Li_2O$ |  | 0.30 | 0.15 |
|  | BaO | Less than 0.01 | Less than 0.01 | 0.01 |
|  | $Fe_2O_3 + TiO_2$ | 0.13 | 0.19 | 0.11 |
|  | $CaO + Y_2O_3$ | 0.13 | 0.20 | 0.10 |
|  | $K_2O + Na_2O$ | 0.37 | 1.11 | 0.67 |
|  | $K_2O/Na_2O$ | 4.3 | 10.1 | 1.6 |
| Characteristic | Cracking at the time of production (maximum length [mm]) | Less than 30 | Less than 30 | 40 |

TABLE 5-continued

|  | Ex. 28 | Ex. 29 | Ex. 30 |
| --- | --- | --- | --- |
| Rate of residual volume expansion in thermal cycle test [vol %] | 2.5 | 1.6 | 1.0 |
| Rate of formation of zircon crystals in thermal cycle test [mass %] | Less than 0.5 | Less than 0.5 | Less than 0.5 |
| Rate of formation of zircon crystals in immersion test 1 [mass %] | Less than 0.5 | Less than 0.5 | Less than 0.5 |
| Rate of formation of zircon crystals in immersion test 2 [mass %] | Less than 0.5 | Less than 0.5 | Less than 0.5 |

TABLE 6

|  |  | Ex. 31 | Ex. 32 | Ex. 33 |
| --- | --- | --- | --- | --- |
| Composition of refractory [mass %] | $ZrO_2$ | 88.95 | 94.68 | 90.09 |
|  | $SiO_2$ | 8.54 | 4.11 | 8.89 |
|  | $Al_2O_3$ | 1.41 | 0.78 | 0.97 |
|  | $Na_2O$ | 0.12 | 0.42 | 0.01 |
|  | $K_2O$ | 0.98 | 0.01 | 0.04 |
|  | $B_2O_3$ | 0.050 | 0.002 | 0.565 |
|  | $P_2O_5$ | 0.050 | 0.003 | 0.052 |
|  | $P_2O_5 + B_2O_3$ | 0.100 | 0.005 | 0.617 |
|  | $Cs_2O$ | Less than 0.05 | Less than 0.05 | Less than 0.05 |
|  | $Li_2O$ | 0.43 |  |  |
|  | BaO | Less than 0.01 | Less than 0.01 | 0.06 |
|  | $Fe_2O_3 + TiO_2$ | 0.17 | 0.13 | 0.18 |
|  | $CaO + Y_2O_3$ | 0.21 | 0.13 | 0.16 |
|  | $K_2O + Na_2O$ | 1.10 | 0.43 | 0.05 |
|  | $K_2O/Na_2O$ | 8.2 | 0.0 | 4.0 |
| Characteristic | Cracking at the time of production (maximum length [mm]) | 110 | Less than 30 | Less than 30 |
|  | Rate of residual volume expansion in thermal cycle test [vol %] | 6.4 | 2.8 | 2.2 |
|  | Rate of formation of zircon crystals in thermal cycle test [mass %] | Less than 0.5 | Less than 0.5 | 4.1 |
|  | Rate of formation of zircon crystals in immersion test 1 [mass %] | Less than 0.5 | 6.2 | 8.7 |
|  | Rate of formation of zircon crystals in immersion test 2 [mass %] | Less than 0.5 | 5.8 | 7.9 |

[Cracking at the Time of Production]

Cracks in an outer appearance of the ingot were evaluated as follows.

First, from the ingot of the high zirconia fused cast refractory, the riser portion was removed to produce a material for a refractory product of 250 mm in thickness×310 mm in width×820 mm in height. Then, the length of cracks which could be visually confirmed on the material was measured by calipers.

In a case where the maximum length of the cracks on the material for the refractory product is 100 mm or longer, it is required to prepare an ingot substantially larger than the dimension of the desired refractory product and then to grind or cut it with a high load, whereby production of such a refractory becomes very expensive and is not practical. Whereas, when the length of cracks in the material for the refractory product is short, it is simply required to produce an ingot slightly larger than the dimension of the desired refractory product and to grind its surface slightly, whereby production of a refractory is easy. Therefore, the length of cracks in a material for a refractory product is preferably less than 100 mm, more preferably at most 70 mm, further preferably at most 50 mm, most preferably less than 30 mm.

[Rate of Residual Volume Expansion in Thermal Cycle Test]

A 40 mm×40 mm×40 mm sample was cut out from a produced fused cast refractory, and subjected to heating and cooling between 800° C. and 1,250° C. for 40 times in an electric furnace. On that occasion, heating from room temperature to 800° C. was carried out at a rate of 160° C. per hour, and from this point, heating to 1,250° C. at a rate of 450° C. per hour immediately after the temperature reached 800° C., and cooling to 800° C. at a rate of 450° C. per hour immediately after the temperature reached 1,250° C., were carried out for one thermal cycle. The thermal cycle between 800° C. and 1,250° C. was repeatedly carried out 40 times. After the final thermal cycle, the sample was cooled from 800° C. to room temperature at a rate of 160° C. per hour. The dimensions of the sample were measured before and after the test, and the rate of residual volume expansion was determined from the change in the dimensions.

In this thermal cycle test, a high zirconia fused cast refractory usually shows residual volume expansion, and in some cases, it has cracks. This residual volume expansion results from a test of a refractory by itself against thermal cycles in a relatively low temperature region, and indicates, when the refractory is applied to a glass melting furnace, the cracking resistance in the vicinity of the furnace outer surface at a relatively low temperature away from the molten glass. The rate of residual volume expansion by this test is preferably less than 3 vol %, more preferably less than 2 vol %.

[Rate of Formation of Zircon Crystals in Thermal Cycle Test]

Further, in some refractories, zircon crystals are formed by the thermal cycle test. With respect to the fused cast refractory after subjected to the above thermal cycle test, the rate of formation of zircon crystals was obtained by a powder X-ray diffraction method. That is, with respect to a powder obtained by grinding the sample after the thermal cycle test, X-ray diffraction measurement was carried out, peak area ratios of zircon crystals and zirconia crystals were obtained from the resulting diffraction pattern, and the mass % of zircon crystals was determined by the ratio of zircon crystal amount/(zircon crystal amount+zirconia crystal amount). This was regarded as the rate of formation of zircon crystals in thermal cycle test. The rate of formation of zircon crystals is preferably at most 4 mass %, more preferably at most 2 mass %.

[Rate of Formation of Zircon Crystals in Immersion Test]

The rate of formation of zircon crystals under conditions of contact with molten glass was obtained by the following immersion test. That is, a 15 mm×25 mm×30 mm sample was cut out from the obtained fused cast refractory, inserted into a 200 cc platinum crucible together with 250 g of alkali-free glass cullet, and heated at a predetermined temperature for a predetermined time in an electric furnace. After cooling, the sample was taken out and ground. With respect to the ground sample powder, X-ray diffraction measurement was carried out, peak area ratios of zircon crystals and zirconia crystals were obtained from the resulting diffraction pattern, and the mass % of zircon crystals was determined from the ratio of zircon crystal amount/(zircon crystal amount+zirconia crystal amount), which was regarded as the rate of formation of zircon crystals in immersion test.

Alkali-free glass used for this test is alkali-free glass having a chemical composition comprising 60 mass % of $SiO_2$, 8 mass % of $B_2O_3$, 17 mass % of $Al_2O_3$, 3 mass % of MgO, 4 mass % of CaO and 8 mass % of SrO.

The test conditions in the immersion test were as follows.

As the immersion test 1, a test at 1,250° C. for 20 days was carried out. In this test, heating from room temperature to 1,250° C. was carried out at a rate of 300° C. per hour, and after the temperature reached 1,250° C., the temperature was maintained for 20 days, the temperature was decreased to 700° C. at a rate of 500° C. per hour and further decreased from 700° C. to room temperature at a rate of 60° C. per hour. In this test, the rate of formation of zircon crystals is preferably at most 4 mass %, more preferably at most 2 mass %.

As the immersion test 2, a test at 1,450° C. for 4 days was carried out. In this test, heating from room temperature to 1,450° C. was carried out at a rate of 300° C. per hour, and after the temperature reached 1,450° C., the temperature was maintained for 4 days, and then the temperature was decreased to 700° C. at a rate of 500° C. per hour and further decreased from 700° C. to room temperature at a rate of 60° C. per hour. In this test, the rate of formation of zircon crystals is preferably at most 4 mass %, more preferably at most 2 mass %.

The above test results are shown in Tables 1 to 6.

As evident from Examples (Ex. 1 to 15 and 28 to 30) in Tables 1, 2 and 5, in the high zirconia fused cast refractories of the present invention, cracks were sufficiently suppressed to a size of less than 30 mm at the time of production, or even if they have cracks, the crack size was 70 mm or smaller. Accordingly, the high zirconia fused cast refractory of the present invention can easily be produced with a high productivity.

Each of the fused cast refractories in Ex. 1 to 15 and 28 to 30 which are Examples of the present invention had a rate of residual volume expansion in the thermal cycle test of less than 3 vol %. Further, although not shown in Tables, each of samples in Examples of the present invention had no cracks formed in this test. It was found that the high zirconia fused cast refractory of the present invention has a high cracking resistance against temperature changes by the refractory itself.

With respect to each of the fused cast refractories in Ex. 1 to 12, 14 to 15, and 28 to 30, no zircon crystals were detected from the sample after the thermal cycle test. According to this measurement method, zircon crystals can be detected when the rate of formation of zircon crystals is 0.5 mass % or higher. Thus, it can be said that in fused cast refractories in Ex. 1 to 12, 14 to 15, and 28 to 30, substantially no reaction to form zircon crystals occurred in the thermal cycle test. Further, in Ex. 13, the $Na_2O$ content is relatively high, and the proportion of $K_2O$ is lower to $Na_2O$, and accordingly zircon crystals were slightly formed, however, the rate of formation of zircon crystals is at a level of 1.4 mass %, at which formation of cracks can sufficiently be suppressed. That is, in the high zirconia fused cast refractory of the present invention, formation of zircon crystals by the refractory itself is suppressed.

With respect to the fused cast refractories in Ex. 1 to 15 and 28 to 30, the rate of formation of zircon crystals in the immersion test 1 was at most 0.9 mass %. Further, with respect to the fused cast refractories in Ex. 1 to 15 and 28 to 30, the rate of formation of zircon crystals in the immersion test 2 was also at most 0.8 mass %.

Since with respect to the refractories in Ex. 1 to 15 and 28 to 30, the rate of formation of zircon crystals was at most 0.9 mass % and was very low in both of the immersion test 1 and the immersion test 2, it can be said that in the high zirconia fused cast refractory of the present invention, zircon crystals are hardly formed even under conditions of contact with glass.

That is, the high zirconia fused cast refractory of the present invention is free from the problem of cracking at the time of production, it has a low rate of residual volume expansion by the thermal cycles by the refractory itself, zircon crystals are hardly formed in it, and further, formation of zircon crystals in it is suppressed even under conditions of contact with molten glass, and accordingly, the refractory of the present invention is a highly durable refractory excellent in the productivity, durability against temperature changes during use and further reusability.

In Tables 3 and 4, high zirconia fused cast refractories not corresponding to the present invention are shown as Comparative Examples.

In the refractories of Ex. 18, 20 to 27 and 31, the cracks at the time of production were 100 mm or larger. Thus, such refractories have problems in the productivity even though they have no problems in the cracking resistance against temperature changes by the refractories themselves, formation of the zircon crystals by the refractories themselves, and formation of zircon crystals under conditions of contact with glass. In Ex. 16, 17, 19, 32 and 33, as mentioned hereinafter, the refractories have problems such that the cracking resistance against temperature changes by the refractories themselves is insufficient, or formation of zircon crystals by the refractories themselves or formation of zircon crystals under conditions of contact with glass is likely to occur.

The refractories in Ex. 16, 17, 26, 27 and 31 have a rate of residual volume expansion in the thermal cycle test of at least 3 vol %. That is, these refractories have insufficient cracking resistance against temperature changes by the refractories themselves.

With respect to the refractories in Ex. 16 to 19 and 27, at least 4 mass % of zircon crystals were detected from the samples after the thermal cycle test. That is, in these refractories, zircon crystals are likely to form by the refractories themselves.

Further, with respect to the refractories in Ex. 16 to 19, 27, 32 and 33, both the rates of formation of zircon crystals in the immersion test 1 and in the immersion test 2 were at least 5 mass %. That is, in these refractories, zircon crystals are still likely to form under conditions of contact with glass.

It is found from the above results that the high zirconia fused cast refractory of the present invention is excellent in the productivity, it hardly has cracks during the heating, zircon crystals are hardly formed in it even by the thermal history by the refractory itself, and zircon crystals are hardly formed in it even upon contact with molten glass. Accordingly, it is a high zirconia fused cast refractory which hardly has cracks even by temperature changes during use or during the cooling at the time of suspension of operation, which has high durability and which is also excellent in the reusability, and it is particularly suitable for a melting furnace for low alkali glass and alkali-free glass.

INDUSTRIAL APPLICABILITY

The high zirconia fused cast refractory of the present invention is excellent in the productivity, has high durability and favorable reusability, prolongs the life of a glass melting furnace, reduces glass defects, and makes it easy to suspend the operation of a glass melting furnace and restart it, and accordingly it is suitable particularly as a refractory for a glass melting furnace.

What is claimed is:

1. A high zirconia fused cast refractory which has a chemical composition comprising from 88 to 96.5 mass % of $ZrO_2$, from 2.5 to 9.0 mass % of $SiO_2$, from 0.4 to 1.5 mass % of $Al_2O_3$, from 0.07 to 0.26 mass % of $Na_2O$, from 0.3 to 1.3 mass % of $K_2O$, from 0 to 0.3 mass % by outer percentage of $Li_2O$, at most 0.08 mass % by outer percentage of $B_2O_3$, and at most 0.08 mass % by outer percentage of $P_2O_5$, and contains $B_2O_3+P_2O_5$ in a content of at most 0.1 mass % by outer percentage.

2. A high zirconia fused cast refractory which has a chemical composition comprising from 88 to 96.5 mass % of $ZrO_2$, from 2.5 to 9.0 mass % of $SiO_2$, from 0.4 to 1.5 mass % of $Al_2O_3$, from 0.07 to 0.26 mass % of $Na_2O$, from 0.3 to 1.3 mass % of $K_2O$, at most 0.08 mass % by outer percentage of $B_2O_3$, and at most 0.08 mass % by outer percentage of $P_2O_5$, and contains $B_2O_3+P_2O_5$ in a content of at most 0.1 mass % by outer percentage.

3. The high zirconia fused cast refractory according to claim 1, wherein the ratio ($K_2O/Na_2O$) of $K_2O$ to $Na_2O$ is from 1.5 to 15.

4. The high zirconia fused cast refractory according to claim 1, which further contains from 0.05 to 3.8 mass % by outer percentage of $Cs_2O$.

5. The high zirconia fused cast refractory according to claim 1, which is for a glass melting furnace.

* * * * *